No. 623,934. Patented Apr. 25, 1899.
G. T. WILSON & E. WEBB.
FLUID ACTUATED REGULATOR.
(Application filed Jan. 28, 1898.)
(No Model.)
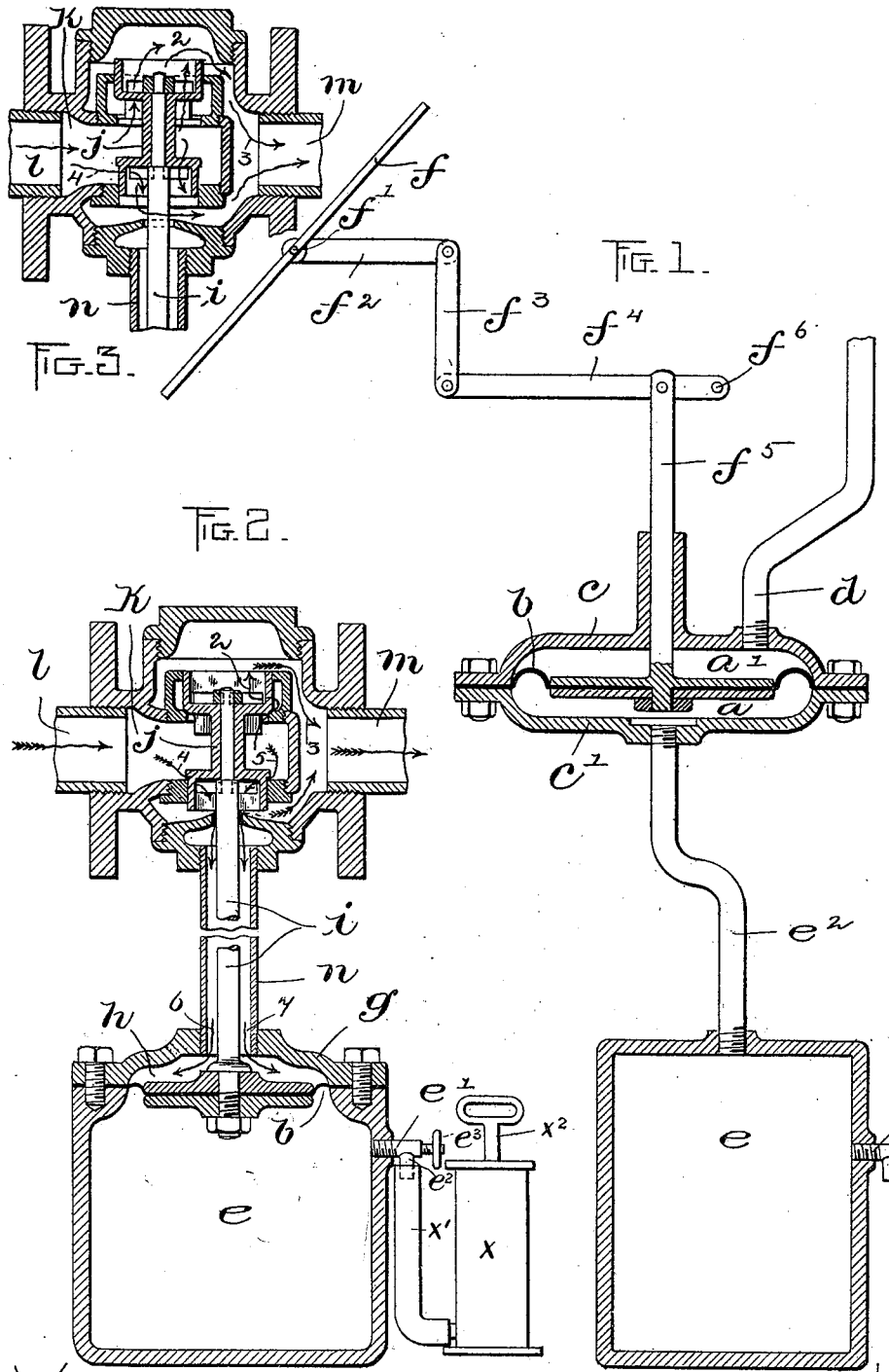
WITNESSES:
A. J. Hamann.
P. W. Pezzetti.
INVENTORS
Geo. T. Wilson
Edw. Webb
by Knight Bros & Quimby
attys.
THE NORRIS PETERS CO., PHOTO-LITHO., WASHINGTON, D. C.

UNITED STATES PATENT OFFICE.

GEORGE T. WILSON, OF SOMERVILLE, AND EDWARD WEBB, OF READING, MASSACHUSETTS, ASSIGNORS TO SAID WEBB, AND JULIAN D'ESTÉ AND MARY L. D'ESTÉ, OF SALEM, MASSACHUSETTS.

FLUID-ACTUATED REGULATOR.

SPECIFICATION forming part of Letters Patent No. 623,934, dated April 25, 1899.

Application filed January 28, 1898. Serial No. 668,268. (No model.)

*To all whom it may concern:*

Be it known that we, GEORGE T. WILSON, of Somerville, and EDWARD WEBB, of Reading, in the county of Middlesex and State of Massachusetts, have invented certain new and useful Improvements in Fluid-Actuated Regulators, of which the following is a specification.

This invention relates to regulators which are actuated by variations of fluid-pressure for automatically performing certain operations, such as regulating the heat of a furnace, &c.

The invention consists, as a whole, in a pressure-actuated regulator comprising two chambers, a flexible diaphragm separating said chambers, a connection between one of said chambers and a source of fluctuating fluid-pressure, such as a steam-boiler, a reservoir connected with the other chamber and adapted to be charged with a fluid, such as air under pressure, and to maintain the charge at a practically constant pressure, and an operating device, such as a damper or a valve, said operating device being connected with the diaphragm, so that it is moved by the movements of the diaphragm occasioned by variations of pressure.

Of the accompanying drawings, forming a part of this specification, Figure 1 represents a sectional view of a regulating apparatus embodying our invention. Figs. 2 and 3 represent sectional views of a different embodiment of the invention.

Referring for the present to Fig. 1, $a$ and $a'$ represent two chambers which are separated by a flexible diaphragm $b$, which may be of any suitable material, such as thin sheet metal or fabric made fluid-tight by rubber or other suitable material. The diaphragm constitutes the inner wall of each of the two chambers, and their outer walls may be formed by means of a suitable casing, here shown as composed of two sections $c\ c'$, the margin of the diaphragm being clamped between the margins of said sections.

$d$ represents a pipe which communicates with the chamber $a'$ and with a source of fluctuating fluid-pressure, such as a steam-boiler.

$e$ represents a reservoir which is adapted to receive a charge of compressed air and to maintain the charge at any desired pressure. As here shown, the reservoir $e$ has an inlet $e'$, provided with a nipple $e^2$, adapted to be connected with a pipe communicating with an air-pump and with a valve $e^3$, adapted to close the inlet and maintain the air therein at a practically constant pressure. The reservoir $e$ is connected by a pipe $e^2$ with the chamber $a$. The diaphragm is therefore exposed at one side to a constant yielding pressure from the reservoir $e$ and at its opposite side to a fluctuating pressure through the pipe $d$. When the pressure in the chamber $a'$ is increased sufficiently to overcome the air-pressure in the reservoir $e$, the diaphragm yields and additionally compresses the air in said reservoir, so that when the pressure in the chamber $a'$ decreases the compressed air quickly moves the diaphragm to a position determined by the relative pressures in the two chambers.

$f$ represents an operating device which is connected by suitable intermediate mechanism with the diaphragm $b$ and is moved by movements of the diaphragm caused by variations of pressure in the chamber $a'$. The operating device $f$ is here shown as a damper controlling the flue through which the products of combustion pass from a furnace, here considered as the furnace which generates steam in the boiler with which the pipe $d$ is connected. The damper is pivoted at $f'$ and is provided with an arm $f^2$, rigidly affixed to the damper, said arm being connected by a link $f^3$ and a lever $f^4$ with a rod $f^5$, which bears upon the diaphragm $b$. The lever $f^4$ is pivoted at $f^6$ to a fixed support.

In Figs. 2 and 3 we have shown an embodiment of our invention in which the diaphragm $b$ is attached to the upper portion of the reservoir and is held in position by a cap or cover $g$, which forms the chamber $h$, corresponding to the chamber $a'$ in Fig. 1. A spindle $i$ is attached to the diaphragm $b$ and extends upwardly through the cover of section $g$. To the upper end of the spindle is attached a valve $j$ in a casing $k$, provided with an inlet-pipe $l$ and an outlet-pipe $m$ for the passage of steam, water, or other fluid, the same being controlled by the diaphragm-operated valve $j$. The upper chamber $h$ is connected with the valve-casing $k$ by means of a sleeve $n$, which provides means for communicating pressure to the upper side of the diaphragm to depress the same against the pressure of air in the lower chamber. The valve is shown with a very small opening for the passage of the fluid, the course of which is indicated by the arrows 2 3 4 5. This position indicates that the pressure in the outlet-pipe (which may be connected with a heating system) has accumulated to such an extent as to communicate pressure to the upper side of the diaphragm, through the sleeve $n$, in the direction of the arrows 6 7 sufficient to depress the diaphragm and with the latter the valve to reduce the valve-opening, and when the pressure becomes diminished the air-pressure upon the opposite side of the diaphragm will open the valve, approximately as shown in Fig. 3.

In Fig. 2 of the drawings we illustrate one form of air pump or compressor which may be employed. The cylinder of said pump is indicated at $x$, the pipe for connection with the nipple $e^2$ at $x'$, and the piston-rod at $x^2$. The illustration represents a common form of pump used for inflating bicycle-tires; but it is to be understood that any form of air-compressor may be employed.

We believe ourselves to be the first to provide a fluid-actuated pressure-regulator in which a diaphragm is acted on at one side by fluctuating fluid-pressure and is yieldingly supported at the opposite side by a practically constant gaseous-fluid pressure and in which the pressure above the diaphragm may be made to exceed that of atmospheric pressure to any desired degree. We therefore do not limit ourselves to the applications of our invention here shown, as our invention may be applied and made available in other ways and in connection with other devices.

We claim—

1. A pressure-actuated regulator, comprising two chambers, a flexible diaphragm separating said chambers, a connection between one of said chambers and a source of fluctuating fluid-pressure, a reservoir connected with the other chamber, said reservoir having an inlet provided with means for connection with an air-compressing device and means for maintaining a charge of compressed air in the reservoir, and an operating device connected with the diaphragm.

2. A pressure-actuated regulator comprising two chambers, a flexible diaphragm separating said chambers, a connection between one of said chambers and a source of fluctuating fluid-pressure, a reservoir connected with the other chamber, said reservoir having a valved inlet, an air-compressing device connected with said inlet, and an operating device connected with the diaphragm.

In testimony whereof we have affixed our signatures in presence of two witnesses.

GEORGE T. WILSON.
EDWARD WEBB.

Witnesses:
JULIAN D'ESTÉ,
C. F. BROWN.